United States Patent
Bischof et al.

(10) Patent No.: US 11,959,894 B2
(45) Date of Patent: Apr. 16, 2024

(54) LIQUID CHROMATOGRAPHY TECHNIQUE

(71) Applicant: SILCOTEK CORP., Bellefonte, PA (US)

(72) Inventors: Jesse Bischof, State College, PA (US); Lucas D. Patterson, Altoona, PA (US); Gary Barone, State College, PA (US); Min Yuan, State College, PA (US); David A. Smith, Bellefonte, PA (US)

(73) Assignee: Silcotek Corp, Bellefonte, PA (US)

( * ) Notice: Subject to any disclaimer, the term of this patent is extended or adjusted under 35 U.S.C. 154(b) by 784 days.

(21) Appl. No.: 16/971,216

(22) PCT Filed: Feb. 22, 2019

(86) PCT No.: PCT/US2019/019209
§ 371 (c)(1),
(2) Date: Aug. 19, 2020

(87) PCT Pub. No.: WO2019/165249
PCT Pub. Date: Aug. 29, 2019

(65) Prior Publication Data
US 2021/0101092 A1  Apr. 8, 2021

Related U.S. Application Data

(60) Provisional application No. 62/634,299, filed on Feb. 23, 2018.

(51) Int. Cl.
*G01N 30/56* (2006.01)
*B01D 15/16* (2006.01)
(Continued)

(52) U.S. Cl.
CPC .......... *G01N 30/56* (2013.01); *B01D 15/161* (2013.01); *B01D 15/163* (2013.01);
(Continued)

(58) Field of Classification Search
CPC .. B01D 15/161; B01D 15/163; B01D 15/166; B01D 15/206; B01D 15/22; G01N 30/30;
(Continued)

(56) References Cited

U.S. PATENT DOCUMENTS 5,215,664 A * 6/1993 Kitazume .......... B01D 15/1807
423/21.5
5,997,742 A  12/1999 Gjerde et al.
(Continued)

OTHER PUBLICATIONS

International Search Report for PCT/US2019/019209 dated May 24, 2019.
(Continued)

*Primary Examiner* — Benjamin R Schmitt
(74) *Attorney, Agent, or Firm* — Saxton & Stump, LLC

(57) ABSTRACT

LC techniques are disclosed. The LC technique includes providing a liquid chromatography system having a coated metallic fluid-contacting element, and transporting a fluid to contact the coated metallic fluid contacting element. Conditions for the transporting of the fluid are selected from the group consisting of the temperature of the fluid being greater than 150 degree Celsius, pressure urging the fluid being greater than 60 MPa, the fluid having a protein-containing analyte incompatible with one of titanium and polyether ether ketone, the fluid having a chelating agent incompatible with the one or both of the titanium or the polyether ether ketone.

19 Claims, 2 Drawing Sheets

(51) Int. Cl.
  *B01D 15/20*   (2006.01)
  *B01D 15/22*   (2006.01)
  *B01D 15/38*   (2006.01)
  *G01N 30/30*   (2006.01)
  *G01N 30/36*   (2006.01)
  *B01J 20/32*   (2006.01)
  *G01N 30/02*   (2006.01)
  *G01N 30/60*   (2006.01)

(52) U.S. Cl.
  CPC ......... *B01D 15/166* (2013.01); *B01D 15/206* (2013.01); *B01D 15/22* (2013.01); *B01D 15/3828* (2013.01); *G01N 30/30* (2013.01); *G01N 30/36* (2013.01); *B01J 20/3265* (2013.01); *G01N 2030/027* (2013.01); *G01N 2030/567* (2013.01); *G01N 30/60* (2013.01)

(58) Field of Classification Search
  CPC ........ G01N 30/36; G01N 30/56; G01N 30/60; G01N 2030/027; G01N 2030/567

See application file for complete search history.

(56) References Cited

U.S. PATENT DOCUMENTS

| 8,092,770 B2 | 1/2012 | Betz et al. | |
| 2001/0037674 A1* | 11/2001 | Petro | B01J 19/0046 |
| | | | 73/61.52 |
| 2003/0165941 A1* | 9/2003 | Gjerde | C12Q 1/6869 |
| | | | 435/6.12 |
| 2004/0029781 A1* | 2/2004 | Hernan | C07K 7/08 |
| | | | 530/324 |
| 2010/0005867 A1* | 1/2010 | Doerr | B01L 7/54 |
| | | | 73/61.53 |
| 2015/0024152 A1 | 1/2015 | Carr et al. | |
| 2016/0136928 A1* | 5/2016 | Zhao | B32B 37/02 |
| | | | 156/60 |
| 2016/0354758 A1 | 12/2016 | Gorecki et al. | |

OTHER PUBLICATIONS

Extended EP Search Report, Mar. 11, 2024, 11 pgs.
S.L. Ali et al., "Separation and quantitative determination of tetracycline, epitetracycline, ep.ianhydrotetracycline and anhydrotetracycline by high-performance liquid chromatography", International Journal of Pharmaceutics, 1, 19787, pp. 185-188.
D. Pruneau et al., "High-Performance Liquid Chromatographic Procedure for Measuring ATP and ADP Levels in Tissue Microbiopsy: Application to Rat Wound Healina Proliferative Tissue", Analytical Biochemistry 119, 1982, pp. 274-280.

* cited by examiner

LIQUID CHROMATOGRAPHY TECHNIQUE

FIELD OF THE INVENTION

The present invention is directed to liquid chromatography techniques. More particularly, the present invention is directed to liquid chromatography techniques utilizing a coated metallic fluid-contacting element.

BACKGROUND OF THE INVENTION

Analytical instrumentation is a constantly evolving field. There are constant desires to become quicker, smaller, more precise, and more accurate. However, such desires create limitations that have not been physically possible with existing materials.

For example, titanium is used in high performance (or pressure) liquid chromatography (HPLC). However, under certain conditions, titanium is incompatible with ammonia, chlorine (both wet and dry), HCl, nitrating acid (nitric and sulfuric combination), phosphoric acid, sodium and potassium hydroxide, bleach, and sulfuric acid. Titanium is also brittle, limiting the ability to bend it, for example, into tubing. Also, titanium is very expensive, resulting it being unavailable for cost-effective techniques.

In contrast, polyether ether ketone (PEEK) is flexible and inexpensive. However, PEEK has many other drawbacks. Under certain conditions, PEEK is incompatible with benzene sulfonic acid, chlorine (both wet and dry), nitric acid, sulfuric acid, carbolic acid, ultraviolet light, methylene chloride, dimethylsulfate, tetrahydrofuran, and other organic solvents. PEEK also has an upper temperature limit of between 100° C. and 143° C., depending upon the application.

A liquid chromatography technique, system, and components, that show one or more improvements in comparison to the prior art would be desirable in the art.

BRIEF DESCRIPTION OF THE INVENTION

In an embodiment, a liquid chromatography technique includes providing a liquid chromatography system having a coated metallic fluid-contacting element, and transporting a fluid to contact the coated metallic fluid-contacting element. Conditions for the transporting of the fluid are selected from the group consisting of the temperature of the fluid being greater than 150° C., pressure urging the fluid being greater than 60 MPa, the fluid having a protein-containing analyte incompatible with one or both of titanium and polyether ether ketone, the fluid having a chelating agent incompatible with the one or both of the titanium or the polyether ether ketone, and combinations thereof.

In another embodiment, a liquid chromatography technique includes providing a liquid chromatography system having a coated metallic column, a degasser, a sample, one or more pumps, and a detector. The liquid chromatography technique further includes transporting a fluid through the coated metallic column, wherein conditions for the transporting of the fluid include one or both of the fluid having a protein-containing analyte incompatible with one or both of titanium and polyether ether ketone, and the fluid having a chelating agent incompatible with the one or both of the titanium or the polyether ether ketone.

In another embodiment, a liquid chromatography technique includes providing a liquid chromatography system having a coated metallic column, a stationary phase being positioned within the coated metallic column, the stationary phase including particles having a size of less than 1.5 micrometers. The liquid chromatography technique further includes transporting a fluid through the coated metallic column, wherein conditions for the transporting of the fluid include the temperature of the fluid being greater than 150° C., pressure urging the fluid within the coated metallic column being greater than 60 MPa, the fluid having a protein-containing analyte incompatible with one or both of titanium and polyether ether ketone, the fluid having a chelating agent incompatible with the one or both of the titanium or the polyether ether ketone, and combinations thereof. The coated metallic column has a coating including carbon, silicon, oxygen, and hydrogen, and a stainless steel substrate, the pH of the fluid is less than 2, the coated metallic column has a diameter of less than 2.1 mm, the coated metallic column has a length of less than 20 cm, and the coated metallic component has a coating having a thickness of at least 400 nm. The transporting of the fluid through the coated metallic column is at a linear velocity of at least 8 mm per second. The fluid includes a solvent selected from the group consisting of water, acetonitrile, methanol, formic acid, phosphoric acid, tetrahydrofuran, trifluoroacetic acid, and combinations thereof. The fluid includes an analyte selected from the group consisting of tetracycline, N-hydroxypyridine-2-on, adenosine triphosphate, and deoxynucleotide monophosphate.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are liquid chromatography techniques, systems, and components. Embodiments of the present disclosure, for example, in comparison to concepts failing to include one or more of the features disclosed herein, expands the capabilities of liquid chromatography, permits increased precision of liquid chromatography, permits increased accuracy of liquid chromatography, permits decreased sizes of columns to be used in liquid chromatography, permits reduced duration of analysis for liquid chromatography, permits bioinert and/or protein anti-stiction operation of liquid chromatography, permits operations with fluids incompatible with titanium under certain conditions (for example, ammonia, chlorine (both wet and dry), HCl, nitrating acid (nitric and sulfuric combination), phosphoric acid, sodium and potassium hydroxide, bleach, and sulfuric acid), permits operation with fluids incompatible with polyether ether ketone (for example, benzene sulfonic acid, chlorine (both wet and dry), nitric acid, sulfuric acid, carbolic acid, ultraviolet light, methylene chloride, dimethylsulfate, tetrahydrofuran, and other organic solvents), permits liquid chromatography to be performed at higher pressures, permits liquid chromatography to be performed at higher temperatures, permits liquid chromatography to be performed with smaller particles in the stationary phase, permits liquid chromatography to be performed with smaller diameter and/or length columns, or permit a combinations thereof.

Figure 1:
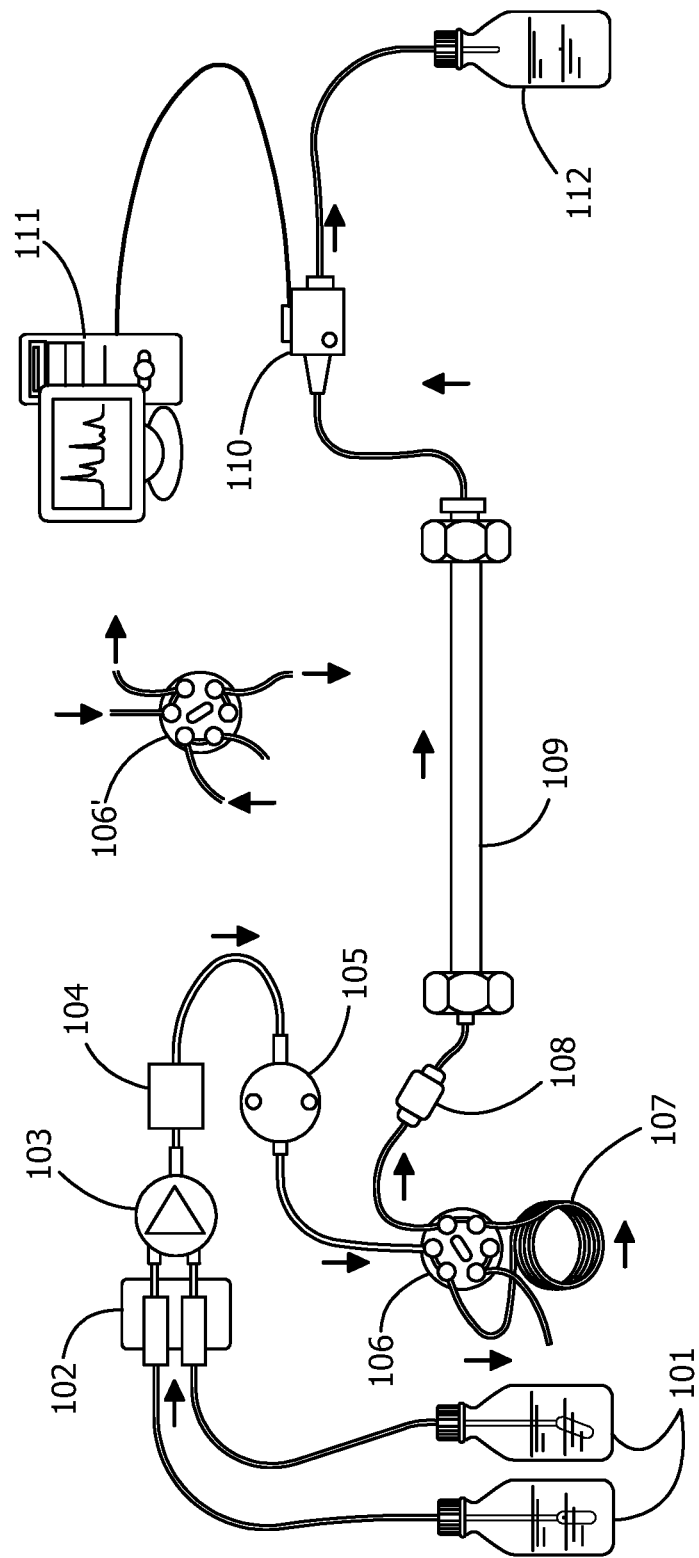
FIG. 1 is a schematic view of a liquid chromatography system for performing an embodiment of a liquid chromatography technique, according to the disclosure.

Referring to FIG. 1, a liquid chromatography technique, utilizing a liquid chromatography system 100, is disclosed. It will be appreciated by those skilled in the art that the liquid chromatography technique is capable of being used with any suitable configuration of the liquid chromatography system 100. Such suitable configurations include, but are not limited to high performance (or pressure) liquid chromatography (HPLC), ultra high performance (or pressure) liquid chromatography (UHPLC), partitioned HPLC or UHPLC, normal-phase chromatography, displacement chromatography, reversed-phase chromatography, size exclusion chromatography, ion-exchange chromatography, or a combination thereof.

Referring again to FIG. 1, an exemplary system 100 includes solvent reservoirs 101, a solvent degasser 102, a gradient valve 103, a mixing vessel 104 for delivery of a mobile phase, a high-pressure pump 105, switching valves 106 in injection position or loading position, a sample injection loop 107, a pre-column portion 108, a coated metallic column 109, a detector 110 (for example, an infrared detector or ultraviolet detector), a data acquisition system 111 (for example, a computer), and a waste or fraction collector 112. Any additional or alternative components are capable of being used, so long as the system 100 includes a coated metallic fluid-contacting element, such as the coated metallic column 109, or any other component of the system 100 that is contacted by a fluid, such as, a mobile phase, a solvent, an analyte, or a combination thereof. Additionally or alternatively, other components are capable of being similarly coated, such as, frits, fittings, pump heads, valves, tubing, vessels, or combinations thereof.

Figure 2:
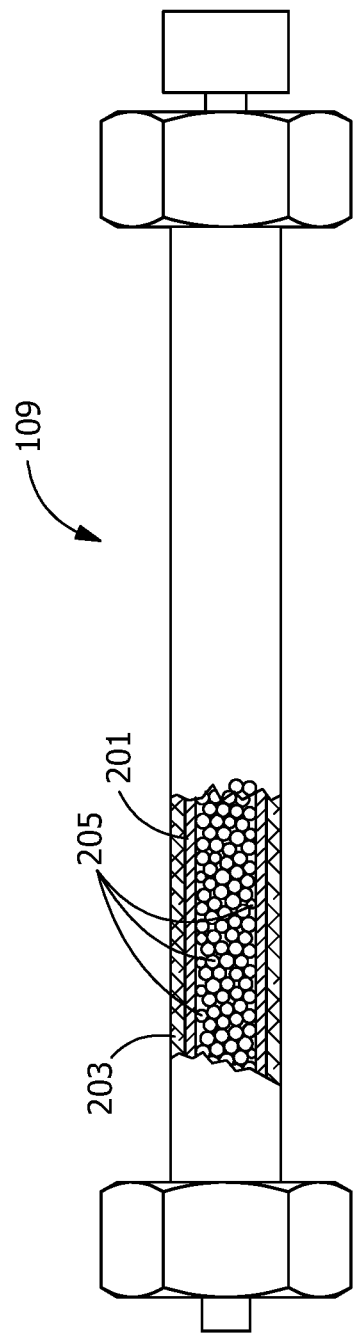
FIG. 2 is a schematic perspective view of a column for a liquid chromatography system capable of performing an embodiment of the liquid chromatography technique, according to the disclosure.

Referring to FIG. 2, in one embodiment, the coated metallic column 109 contains particles 205 or beads. The particles 205 serve as a stationary phase during the liquid chromatography technique. The particles 205 have a size (for example, a diameter and/or width) that is less than 10 micrometers, less than 6 micrometers, less than 5 micrometers, less than 3 micrometers, less than 2 micrometers, less than 1.7 micrometers, less than 1.5 micrometers, between 1 micrometer and 10 micrometers, between 1 micrometer and 5 micrometers, between 1 micrometer and 3 micrometers, between 1 micrometer and 2 micrometers, 0.67 micrometers, less than 0.67 micrometers, or any suitable combination, sub-combination, range, or sub-range therein. In one embodiment, the particles 205 are hydrophobic and/or porous. A coating 203 on the coated metallic column 109 permits the particles 205 having such dimensions and features to be used during the liquid chromatography technique. Suitable thicknesses of the coating 203 include, but are not limited to, at least 50 nm, at least 100 nm, at least 200 nm, at least 300 nm, at least 400 nm, at least 600 nm, at least 800 nm, at least 1,000 nm, at least 1,200 nm, between 50 nm and 1,600 nm, between 400 nm and 1,600 nm, between 1,000 nm and 1,600 nm, or any suitable combination, sub-combination, range, or sub-range therein.

Suitable lengths for the coated metallic column 109 include, but are limited to, between 10 cm and 20 cm, between 10 cm and 50 cm, 15 cm, greater than 10 cm, greater than 14 cm, less than 20 cm, less than 16 cm, between 10 cm and 400 cm, between 10 cm and 100 cm, greater than 100 cm, greater than 250 cm, or any suitable combination, sub-combination, range, or sub-range therein.

Suitable diameters (or widths) for the coated metallic column 109 include, but are limited to, less than 2.1 mm, less than 1.7 cm, less than 1.5 cm, less than 0.3 mm, or any suitable combination, sub-combination, range, or sub-range therein.

The coated metallic column 109 includes a substrate 201 and the coating 203. The substrate 201 is a metallic material, such as stainless steel. Suitable stainless steels include 304 stainless steel and 316 stainless steel. Any other metallic material compatible with the operational conditions of the liquid chromatography technique are suitable. Suitable metallic materials include, but are not limited to, ferrous-based alloys, non-ferrous-based alloys, nickel-based alloys, stainless steels (martensitic or austenitic), aluminum alloys, composite metals, or combinations thereof.

In one embodiment, the metallic material is or includes a composition, by weight, of up to 0.08% carbon, between 18% and 20% chromium, up to 2% manganese, between 8% and 10.5% nickel, up to 0.045% phosphorus, up to 0.03% sulfur, up to 1% silicon, and a balance of iron (for example, between 66% and 74% iron).

In one embodiment, the metallic material is or includes a composition, by weight, of up to 0.08% carbon, up to 2% manganese, up to 0.045% phosphorus, up to 0.03% sulfur, up to 0.75% silicon, between 16% and 18% chromium, between 10% and 14% nickel, between 2% and 3% molybdenum, up to 0.1% nitrogen, and a balance of iron.

In one embodiment, the metallic material is or includes a composition, by weight, of up to 0.03% carbon, up to 2% manganese, up to 0.045% phosphorus, up to 0.03% sulfur, up to 0.75% silicon, between 16% and 18% chromium, between 10% and 14% nickel, between 2% and 3% molybdenum, up to 0.1% nitrogen, and a balance of iron.

In one embodiment, the metallic material is or includes a composition, by weight, of between 14% and 17% chromium, between 6% and 10% iron, between 0.5% and 1.5% manganese, between 0.1% and 1% copper, between 0.1% and 1% silicon, between 0.01% and 0.2% carbon, between 0.001% and 0.2% sulfur, and a balance nickel (for example, 72%).

In one embodiment, the metallic material is or includes a composition, by weight, of between 20% and 24% chromium, between 1% and 5% iron, between 8% and 10% molybdenum, between 10% and 15% cobalt, between 0.1% and 1% manganese, between 0.1% and 1% copper, between 0.8% and 1.5% aluminum, between 0.1% and 1% titanium, between 0.1% and 1% silicon, between 0.01% and 0.2% carbon, between 0.001% and 0.2% sulfur, between 0.001% and 0.2% phosphorus, between 0.001% and 0.2% boron, and a balance nickel (for example, between 44.2% and 56%).

In one embodiment, the metallic material is or includes a composition, by weight, of between 20% and 23% chromium, between 4% and 6% iron, between 8% and 10% molybdenum, between 3% and 4.5% niobium, between 0.5% and 1.5% cobalt, between 0.1% and 1% manganese, between 0.1% and 1% aluminum, between 0.1% and 1% titanium, between 0.1% and 1% silicon, between 0.01% and 0.5% carbon, between 0.001% and 0.02% sulfur, between 0.001% and 0.02% phosphorus, and a balance nickel (for example, 58%).

In one embodiment, the metallic material is or includes a composition, by weight, of between 25% and 35% chromium, between 8% and 10% iron, between 0.2% and 0.5% manganese, between 0.005% and 0.02% copper, between 0.01% and 0.03% aluminum, between 0.3% and 0.4% silicon, between 0.005% and 0.03% carbon, between 0.001% and 0.005% sulfur, and a balance nickel (for example, 59.5%).

In one embodiment, the metallic material is or includes a composition, by weight, of between 17% and 21% chromium, between 2.8% and 3.3% iron, between 4.75% and 5.5% niobium, between 0.5% and 1.5% cobalt, between 0.1% and 0.5% manganese, between 0.2% and 0.8% copper, between 0.65% and 1.15% aluminum, between 0.2% and 0.4% titanium, between 0.3% and 0.4% silicon, between 0.01% and 1% carbon, between 0.001 and 0.02% sulfur, between 0.001 and 0.02% phosphorus, between 0.001 and 0.02% boron, and a balance nickel (for example, between 50% and 55%).

In one embodiment, the metallic material is or includes a composition, by weight, of between 2% and 3% cobalt, between 15% and 17% chromium, between 5% and 17% molybdenum, between 3% and 5% tungsten, between 4% and 6% iron, between 0.5% and 1% silicon, between 0.5% and 1.5% manganese, between 0.005 and 0.02% carbon, between 0.3% and 0.4% vanadium, and a balance nickel.

In one embodiment, the metallic material is or includes a composition, by weight, of up to 0.15% carbon, between 3.5% and 5.5% tungsten, between 4.5% and 7% iron, between 15.5% and 17.5% chromium, between 16% and 18% molybdenum, between 0.2% and 0.4% vanadium, up to 1% manganese, up to 1% sulfur, up to 1% silicon, up to 0.04% phosphorus, up to 0.03% sulfur, and a balance nickel.

In one embodiment, the metallic material is or includes a composition, by weight, of up to 2.5% cobalt, up to 22% chromium, up to 13% molybdenum, up to 3% tungsten, up to 3% iron, up to 0.08% silicon, up to 0.5% manganese, up to 0.01% carbon, up to 0.35% vanadium, and a balance nickel (for example, 56%).

In one embodiment, the metallic material is or includes a composition, by weight, of between 1% and 2% cobalt, between 20% and 22% chromium, between 8% and 10% molybdenum, between 0.1% and 1% tungsten, between 17% and 20% iron, between 0.1% and 1% silicon, between 0.1% and 1% manganese, between 0.05 and 0.2% carbon, and a balance nickel.

In one embodiment, the metallic material is or includes a composition, by weight, of between 0.01% and 0.05% boron, between 0.01% and 0.1% chromium, between 0.003% and 0.35% copper, between 0.005% and 0.03% gallium, between 0.006% and 0.8% iron, between 0.006% and 0.3% magnesium, between 0.02% and 1% silicon+iron, between 0.006% and 0.35% silicon, between 0.002% and 0.2% titanium, between 0.01% and 0.03% vanadium+titanium, between 0.005% and 0.05% vanadium, between 0.006% and 0.1% zinc, and a balance aluminum (for example, greater than 99%).

In one embodiment, the metallic material is or includes a composition, by weight, of between 0.05% and 0.4% chromium, between 0.03% and 0.9% copper, between 0.05% and 1% iron, between 0.05% and 1.5% magnesium, between 0.5% and 1.8% manganese, between 0.5% and 0.1% nickel, between 0.03% and 0.35% titanium, up to 0.5% vanadium, between 0.04% and 1.3% zinc, and a balance aluminum (for example, between 94.3% and 99.8%).

In one embodiment, the metallic material is or includes a composition, by weight, of between 0.0003% and 0.07% beryllium, between 0.02% and 2% bismuth, between 0.01% and 0.25% chromium, between 0.03% and 5% copper, between 0.09% and 5.4% iron, between 0.01% and 2% magnesium, between 0.03% and 1.5% manganese, between 0.15% and 2.2% nickel, between 0.6% and 21.5% silicon, between 0.005% and 0.2% titanium, between 0.05% and 10.7% zinc, and a balance aluminum (for example, between 70.7% to 98.7%).

In one embodiment, the metallic material is or includes a composition, by weight, of between 0.15% and 1.5% bismuth, between 0.003% and 0.06% boron, between 0.03% and 0.4% chromium, between 0.01% and 1.2% copper, between 0.12% and 0.5% chromium+manganese, between 0.04% and 1% iron, between 0.003% and 2% lead, between 0.2% and 3% magnesium, between 0.02% and 1.4% manganese, between 0.05% and 0.2% nickel, between 0.5% and 0.5% oxygen, between 0.2% and 1.8% silicon, up to 0.05% strontium, between 0.05% and 2% tin, between 0.01% and 0.25% titanium, between 0.05% and 0.3% vanadium, between 0.03% and 2.4% zinc, between 0.05% and 0.2% zirconium, between 0.150 and 0.2% zirconium+titanium, and a balance of aluminum (for example, between 91.7% and 99.6%).

In one embodiment, the metallic material is or includes a composition, by weight, of between 0.4% and 0.8% silicon, up to 0.7% iron, between 0.15% and 0.4% copper, up to 0.15% manganese, between 0.8% and 1.2% magnesium, between 0.04% and 0.35% chromium, up to 0.25% zinc, up to 0.15% titanium, optional incidental impurities (for example, at less than 0.05% each, totaling less that 0.15%), and a balance of aluminum (for example, between 95% and 98.6%).

In one embodiment, the metallic material is or includes a composition, by weight, of between 11% and 13% silicon, up to 0.6% impurities/residuals, and a balance of aluminum.

The coating 203 includes one or a plurality of depositions, decompositions, functionalizations, oxidations, or a combination thereof. In one embodiment, the coating 203 includes carbon, silicon, oxygen, and hydrogen. In additional or alternative embodiments, other constituents in the coating 203 include, but are not limited to, fluorine, nitrogen, decompositional materials from precursor materials, functionalizations from precursor materials, or a combination thereof. Suitable precursor materials include, but are not limited to, silane, silane and ethylene, silane and an oxidizer, dimethylsilane, dimethylsilane and an oxidizer, trimethylsilane, trimethylsilane and an oxidizer, dialkylsilyl dihydride, alkylsilyl trihydride, non-pyrophoric species (for example, dialkylsilyl dihydride and/or alkylsilyl trihydride), thermally-reacted material (for example, carbosilane and/or carboxysilane, such as, amorphous carbosilane and/or amorphous carboxysilane), species capable of a recombination of carbosilyl (disilyl or trisilyl fragments), methyltrimethoxysilane, methyltriethoxysilane, dimethyldimethoxysilane, dimethyldiethoxysilane, trimethylmethoxysilane, trimethylethoxysilane, ammonia, hydrazine, trisilylamine, Bis(tertiary-butylamino)silane, 1,2-bis(dimethylamino)tetramethyldisilane, dichlorosilane, hexachlorodisilane), organofluorotrialkoxysilane, organofluorosilylhydride, organofluoro silyl, fluorinated alkoxysilane, fluoroalkylsilane, fluorosilane, tridecafluoro 1,1,2,2-tetrahydrooctylsilane, (tridecafluoro-1,1,2,2-tetrahydrooctyl) triethoxysilane, triethoxy (3,3,4,4,5,5,6,6,7,7,8,8,8-tridecafluoro-1-octyl) silane, (perfluorohexylethyl) triethoxysilane, silane (3,3,4,4,5,5,6,6,7,7,8,8,9,9,10,10,10-heptadecafluorodecyl) trimethoxy-, or a combination thereof.

The liquid chromatography technique includes a fluid transported through the coated metallic column 109, for example, passing through the particles 205 serving as the stationary phase for the liquid chromatography technique. The fluid is or includes the mobile phase, one or more solvents, one or more analytes, or a combination thereof.

Suitable species of the fluid include, but are not limited to a protein-containing analyte incompatible with one or both of titanium and polyether ether ketone and a chelating agent incompatible with the one or both of the titanium or the polyether ether ketone. Specific solvents capable of being used within the liquid chromatography technique include, but are not limited to, water, acetonitrile, methanol, formic acid, phosphoric acid, tetrahydrofuran, trifluoroacetic acid, and combinations thereof. Specific analytes capable of being used within the liquid chromatography technique include, but are not limited to, tetracycline, N-hydroxypyridine-2-on, adenosine triphosphate, and deoxynucleotide monophosphate.

In one embodiment, the liquid chromatography technique includes the fluid being at a temperature not suitable for polyether ether ketone and/or titanium, for example, in conjunction with other operational parameters of the liquid chromatography technique. Such temperatures include, but are not limited to, between 100° C. and 200° C., between 200° C. and 300° C., between 300° C. and 400° C., between 400° C. and 450° C., greater than 150° C., greater than 200° C., greater than 250° C., greater than 300° C., greater than 350° C., greater than 400° C., or any suitable combination, sub-combination, range, or sub-range therein.

In one embodiment, the liquid chromatography technique includes the fluid being urged by a pressure not suitable for polyether ether ketone and/or titanium, for example, in conjunction with other operational parameters of the liquid chromatography technique. Such pressures include, but are not limited to, between 10 MPa and 150 MPa, 30 Mpa and 150 MPa, 50 MPa and 100 MPa, between 100 MPa and 150 MPa, between 100 MPa and 200 MPa, or any suitable combination, sub-combination, range, or sub-range therein.

In one embodiment, the liquid chromatography technique includes the fluid being at a pH value not suitable for polyether ether ketone and/or titanium, for example, in conjunction with other operational parameters of the liquid chromatography technique. Such pH values include, but are not limited to, less than 3, less than 2, less than 1, greater than 9, greater than 10, greater than 12, between 0 and 3, between 9 and 14, between 0 and 14, or any suitable combination, sub-combination, range, or sub-range therein.

In one embodiment, the liquid chromatography technique includes the fluid being transported at a linear velocity not suitable for polyether ether ketone and/or titanium, for example, in conjunction with other operational parameters of the liquid chromatography technique. Such linear velocities include, but are not limited to, between 1 and 9 mm per second, between 3 and 9 mm per second, at least 3 mm per second, at least 8 mm per second, or any suitable combination, sub-combination, range, or sub-range therein.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A liquid chromatography technique, comprising:
   providing a liquid chromatography system having a coated metallic column, a degasser, a sample, one or more pumps, and a detector;
   transporting a fluid through the coated metallic column, wherein the fluid includes an analyte selected from the group consisting of N-hydroxypyridine-2-on and deoxynucleotide monophosphate.

2. The liquid chromatography technique of claim 1, wherein the coated metallic column has a coating including carbon, silicon, oxygen, and hydrogen, and a stainless steel substrate.

3. The liquid chromatography technique of claim 1, wherein the coated metallic column has a coating including carbon, silicon, oxygen, hydrogen, and fluorine, and a stainless steel substrate.

4. The liquid chromatography technique of claim 1, wherein the coated metallic column has a coating including carbon, silicon, oxygen, hydrogen, and nitrogen, and a stainless steel substrate.

5. The technique of claim 1, wherein the fluid is at a pressure of greater than 120 MPa.

6. The technique of claim 1, wherein the temperature of the fluid is greater than 400° C.

7. The technique of claim 1, wherein the pH of the fluid is less than 2.

8. The technique of claim 1, wherein the coated metallic column is a coated metallic column has a diameter of less than 2.1 mm.

9. The technique of claim 1, wherein the coated metallic column has a length of less than 20 cm.

10. The technique of claim 1, wherein the transporting of the fluid through the coated metallic column is at a linear velocity of at least 8 mm per second.

11. The technique of claim 1, wherein the fluid includes a solvent selected from the group consisting of water, acetonitrile, methanol, formic acid, phosphoric acid, tetrahydrofuran, trifluoroacetic acid, and combinations thereof.

12. The technique of claim 1, wherein the liquid chromatography system comprises a stationary phase positioned within the coated metallic column, the stationary phase including particles having a size of less than 3 micrometers, and the coated metallic column having a length of between 10 cm and 20 cm.

13. The technique of claim 1, wherein the liquid chromatography system comprises a stationary phase positioned within the coated metallic column, the stationary phase including particles having a size of less than 1.5 micrometers.

14. The technique of claim 1, wherein the coated metallic column is bioinert.

15. The technique of claim 1, wherein the coated metallic column is resistant to protein stiction.

16. The technique of claim 1, wherein the coated metallic column has a coating having a thickness of at least 400 nm.

17. The technique of claim 1, wherein the coated metallic column has a coating having a thickness of between 1,000 nm and 1,600 nm.

18. The technique of claim 1, wherein the fluid includes N-hydroxypyridine-2-on.

19. The technique of claim 1, wherein the fluid is deoxynucleotide monophosphate.

* * * * *